US009591931B1

(12) United States Patent
Oren

(10) Patent No.: US 9,591,931 B1
(45) Date of Patent: Mar. 14, 2017

(54) APPARATUS FOR HOLDING AND ORGANIZING ARTICLES

(71) Applicant: Meir Oren, Ramat Hasharon (IL)

(72) Inventor: Meir Oren, Ramat Hasharon (IL)

( * ) Notice: Subject to any disclaimer, the term of this patent is extended or adjusted under 35 U.S.C. 154(b) by 0 days.

(21) Appl. No.: 15/134,205

(22) Filed: Apr. 20, 2016

(30) Foreign Application Priority Data

Aug. 19, 2015 (IL) .......................................... 240681

(51) Int. Cl.
*B25H 3/04* (2006.01)
*F16B 2/24* (2006.01)
*A47F 5/08* (2006.01)
*A47B 96/14* (2006.01)

(52) U.S. Cl.
CPC ........ *A47F 5/0853* (2013.01); *A47B 96/1433* (2013.01); *A47B 96/1466* (2013.01); *B25H 3/04* (2013.01); *F16B 2/245* (2013.01); *A47B 2096/1491* (2013.01)

(58) Field of Classification Search
CPC .... A47F 5/0807; A47F 5/0846; A47F 5/0853; A47F 7/0028; A47B 96/1433; A47B 96/1441; A47B 96/1466; A47B 2096/1491; B25H 3/04; B25H 5/00; F16B 2/245
USPC .... 211/70.6, 89.01, 94.01, 106.01, 120, 124, 211/124.1, 125, 162; 248/220.11, 303, 248/304; 40/658
See application file for complete search history.

(56) References Cited

U.S. PATENT DOCUMENTS

| | | | | |
|---|---|---|---|---|
| 1,117,491 A * | 11/1914 | Hornung | ................ | A47G 25/12 211/63 |
| 1,781,991 A * | 11/1930 | Stover | .................. | A47B 61/003 211/94.01 |
| 1,906,874 A * | 5/1933 | Platt | ...................... | A47L 13/512 24/457 |
| 2,695,105 A * | 11/1954 | Mitchell | ................ | A47B 61/04 211/35 |
| 3,297,290 A * | 1/1967 | Patterson | .............. | A47F 5/0068 211/59.1 |
| 3,515,284 A * | 6/1970 | Taylor | .................. | A47B 96/067 211/60.1 |
| 3,815,756 A * | 6/1974 | Cox | ....................... | A47F 5/0853 211/57.1 |
| 4,119,285 A * | 10/1978 | Bisping | ..................... | F16L 3/24 248/222.12 |
| 5,154,304 A * | 10/1992 | McAuley | ............... | A47F 5/0846 211/106.01 |
| 5,419,443 A * | 5/1995 | Niederberger | ........ | A47L 13/512 211/70.6 |
| 5,727,697 A * | 3/1998 | Ricciardelli | .......... | A47F 7/0028 211/89.01 |
| 5,775,520 A * | 7/1998 | Drower | ................. | A47F 7/0028 211/120 |
| 6,571,966 B1 * | 6/2003 | Hsiao | .................... | A47F 7/0028 206/379 |

(Continued)

*Primary Examiner* — Joshua Rodden
(74) *Attorney, Agent, or Firm* — Troutman Sanders LLP

(57) ABSTRACT

Disclosed is a system for holding and organizing articles that provides for easy addition of new holding elements to the system without the need to disturb existing system elements. The system includes holding "clips" that are deployable on the system "rail" by inserting a portion of the clip through a slot in the rail, at substantially any point along the length of the slot. The clip, upon being inserted into the rail, then lockingly engages the rail at substantially any point along the length of the slot.

20 Claims, 5 Drawing Sheets

(56) References Cited

U.S. PATENT DOCUMENTS

| | | | | |
|---|---|---|---|---|
| 7,028,854 B1* | 4/2006 | Londrico | ............... | A47B 65/00 |
| | | | | 211/120 |
| 7,490,727 B2* | 2/2009 | Spiers | ................... | A47F 7/0028 |
| | | | | 211/70.6 |
| 2004/0099624 A1* | 5/2004 | Hein | .................... | A47L 13/512 |
| | | | | 211/89.01 |
| 2004/0178313 A1* | 9/2004 | Oren | ................... | A47B 96/061 |
| | | | | 248/316.7 |
| 2006/0234846 A1* | 10/2006 | Tucker | .................... | B25H 3/04 |
| | | | | 483/26 |
| 2010/0025562 A1* | 2/2010 | Shiao | ....................... | B25H 3/04 |
| | | | | 248/682 |
| 2013/0015288 A1* | 1/2013 | Hernandez | .............. | F16B 2/245 |
| | | | | 244/3.1 |
| 2016/0016306 A1* | 1/2016 | Haddon | .................. | B25H 3/04 |
| | | | | 211/70.6 |

\* cited by examiner

APPARATUS FOR HOLDING AND ORGANIZING ARTICLES

CROSS REFERENCE TO EXISTING APPLICATIONS

This application claims foreign priority under the Paris Convention and 35 U.S.C. §119 to Israel Patent Application No. Israel Application No. 240681, filed Aug. 19, 2015 with the Israel Patent Office.

FIELD OF THE INVENTION

The present invention relates to mechanisms for holding and organizing articles and, in particular, it concerns an apparatus that provides for easy addition of new holding elements to the apparatus without the need to disturb existing system elements, and further providing for easy adjustment of holding elements within the apparatus.

BACKGROUND OF THE INVENTION

One embodiment of a device disclosed in U.S. Pat. No. 3,515,284 to Taylor consists of a runner bar and springy clip halves, the clips being held in place by the friction of the spring effect between two legs of the clip base. Each of the clips of Taylor must be inserted into the runner bar at one of the two ends and then slid to the desired location along the length of the runner bar. This may prove to be a cumbersome process if a large number of clips need to be arranged along the length of a loge runner bar. Once a suitable arrangement of clips is deployed, articles may be held in place between two opposing clips. If a new article is to be added to the group of articles stored or held on the assembled device, it may require that some clips be removed from the end of the runner bar, the clips for the new article inserted into the runner bar and the previously removed clips reinserted. One can well imagine the inconvenience of this process if a large number of clips must be removed and reinserted.

One solution to overcome the problem of feed holding elements from an open end of a runner of rail is disclosed in U.S. Pat. No. 4,826,022 to Duarte. The Duarte device includes two panels each of which contain associated slots. One of the slots is configured with notches arranged to engage the engagement portion of the hanger element. Placement of the Duarte hangers is limited by the position of the notches, and therefore placement of the hangers is not continuously variable along the full length of the slot.

Another solution to overcome feeding holding elements from the end of a runner or rail is disclosed in U.S. Pat. No. 4,635,801 to the present inventor. The rails of this device are configured with a longitudinal slot. The holding elements are configured with a holder portion configured to extend perpendicular to the rail, with a gripper portion configured so as to fit through the slot. Once inserted in the slot the gripper is rotated so as to align with the rail along the edge of the slot. By tightening a screw, the gripper then grips the portion of the rail between the gripper and the base of the holder portion. This device suffers from the need to rotate the gripper so as to bring it into suitable alignment with the rail, both during installation of the holding element and when adjusting the position of the holding element on the rail.

Yet another solution to overcome feeding holding elements from the end of a runner or rail is disclosed in U.S. Pat. No. 6,986,430 to the present inventor. The disclosed system provides for easy addition of new holding elements to the system without the need to disturb existing system elements. The system includes holding "clips" that are deployable on the system "rail" by inserting a portion of the clip through a slot in the rail, at substantially any point along the length of the slot. The clip then lockingly engages the rail at substantially any point along the length of the slot. However, the clips are built such that after being inserted into the rail the clip must be rotated 90° to be in operational position.

There is therefore a need for a holding and storage system that provides easy attachment of holding elements to a base element substantially along the entire length of a slot provided in the base element such that a connecting portion of the holding element may be inserted into the slot at substantially any point along the length of the slot, wherein after deployment the holding element is in operational position.

SUMMARY OF THE INVENTION

According to the teachings of the present invention there is provided, a holding-and-organizing apparatus for holding and storing articles. The apparatus includes at least one support element and at least one holder element. The support element includes a forward wall configured with at least one slot, the slot being defined by spaced apart substantially parallel edges. The forward wall have a wall thickness, wherein an inner space is formed behind the forward wall.

The holder element includes a base having two sides, a first end and a second end, a position-retaining mechanism and an article support arm having an article holding portion. The position-retaining mechanism includes a pair of springy lower walls that extend from each of the sides of the base, extending away from said base and both in the same direction, starting at and proximal to the first end of the base, wherein the springy lower walls are generally perpendicular to the base and generally parallel to each other, and wherein a lower gap is formed between said of springy lower walls. The position-retaining mechanism further includes a pair of unlocking leaves, wherein each unlocking leaf extends from a respective springy lower wall, wherein an upper gap is formed between said unlocking leaves, and wherein said upper gap and said lower gap facilitate motion of said unlocking leaves towards each other and thereby motion of said springy lower walls towards each other.

A ridge is formed on the external surface of each springy lower wall, at the border line between the springy lower wall and the respective unlocking leaf, wherein the width measured between the two respective ridges is larger than the width between the external virtual lines on the external surface of each springy lower wall, immediately adjacent to the respective ridges. All of the ridges in one side have substantially the same distance from the respective base side. The inner space is configured to receive the position-retaining portion.

The springy lower walls are configured so as to be elastically deformable between a relaxed state and a compressed state, such that in the compressed state the position-retaining portion is insertable through the slot into the inner space, and wherein upon insertion of the springy lower walls through the slot, as the ridges pass the edges of the slot, the springy lower walls are released toward the relaxed state and the ridges engage with the inner rims of the slot and the inner surface of the front wall proximal to the inner rims of the slot, and wherein the external surface of the unlocking leaves, proximal to the ridge, engage the edges of the slot, thereby retaining the holder element in position on the support element, the engagement being at substantially any point along the slot.

Preferably, the springy lower walls divert slightly from each other as the pair of springy lower walls extend away from the base.

Preferably, the unlocking leaves diverge slightly from each other as the pair of unlocking leaves extend away from the base.

Preferably, the unlocking leaves are made of laterally flat springy material such as metal, and wherein the flat dimension of the unlocking leaves is parallel to the sides of the base.

Preferably, the article holding portion is configured so as to be elastically deformable.

Preferably, the article support arm includes an arm-lower-wall and the article holding portion, wherein at least the article holding portion is made of laterally flat material such as metal, and wherein the flat dimension of the unlocking leaves is perpendicular to the sides of the base. The arm-lower-wall extends from the second end of the base, in the same direction as the unlocking leaves, wherein the article holding portion extends from the arm-lower-wall, and wherein the article support arm is longer than the unlocking leaves.

Preferably, the arm-lower-wall is narrower than the flat article holding portion, forming a stopper on both sides of flat article holding portion at the virtual boundary line between the flat arm-lower-wall and the article holding portion.

Preferably, the stopper is spatially situated more distal from the base than the ridge, by a distance that is substantially equal to the wall thickness.

Preferably, the stopper is spatially situated such that upon the insertion of the position-retaining portion through the slot and the springy lower walls are released toward the relaxed state so as to the ridges engage with the inner rims of the slot and the inner surface of the front wall proximal to the inner rims of the slot, and wherein the external surface of the unlocking leaves, proximal to the ridge, the stopper blocks the further insertion of the position-retaining portion through the slot.

Preferably, the at least one support element is configured as a rail with a constant cross-sectional profile.

Optionally, the at least one support element is an extruded rail configured from a material chosen from a list of materials including metals and plastics.

Optionally, the open ends of the at least one support element are enclosed by fitted rail-plugs.

Optionally, at least two of the support elements are interconnected by a fitted mediating-plug.

Optionally, the article holding portion configured to independently supports an article.

Optionally, the article holding portion is configured as a hook.

Optionally, the holder element is configured as at least two associated holder elements arranged to support an article.

Optionally, the holder elements are configured such that at least one of the article holding portion is springy such that, once deployed on the support element, the springiness is in a direction substantially parallel to the slot, whereby an article is supported between the two holder elements by the force of the spring tension of the at least one springy article holding portion.

There is also provided according to the teachings of the present invention, a deployment method for deploying a holder element on a support element. The method includes the steps of: a) providing a holding-and-organizing apparatus; b) inserting the position-retaining portion through the slot; and c) upon the stopper reaching the external surface of the forward wall, terminating the insertion step.

According to a further teaching of the present invention, there is provided a method for removing a holder element from a support element, the method includes the steps of a) providing a holding-and-organizing apparatus; b) pressing the unlocking leaves towards each other; and c) removing the holder element from the support element through the slot.

BRIEF DESCRIPTION OF THE DRAWINGS

The present invention will become fully understood from the detailed description given herein below and the accompanying drawings, which are given by way of illustration and example only and thus not limitative of the present invention, and wherein.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein are not to be construed as limiting and are for descriptive purpose only.

Meanings of technical and scientific terms used herein are to be commonly understood as to which the invention belongs, unless otherwise defined. The present invention can be implemented in the testing or practice with methods and materials equivalent or similar to those described herein.

It should be noted that orientation related descriptions such as "bottom", "up", "upper", "down", "lower", "top" and the like, assumes that the associated item is operationally situated, that is, with no limitations, securely attached to a vertical wall and being faced by a viewer.

The present invention is an apparatus for holding and organizing articles that provides for easy addition of new holding elements to the system without the need to disturb existing system elements.

The principles and operation of an apparatus for holding and organizing articles that provides for easy addition of new holding elements to the apparatus without the need to disturb existing system elements according to the present invention may be better understood with reference to the drawings and the accompanying description.

Figure 1:
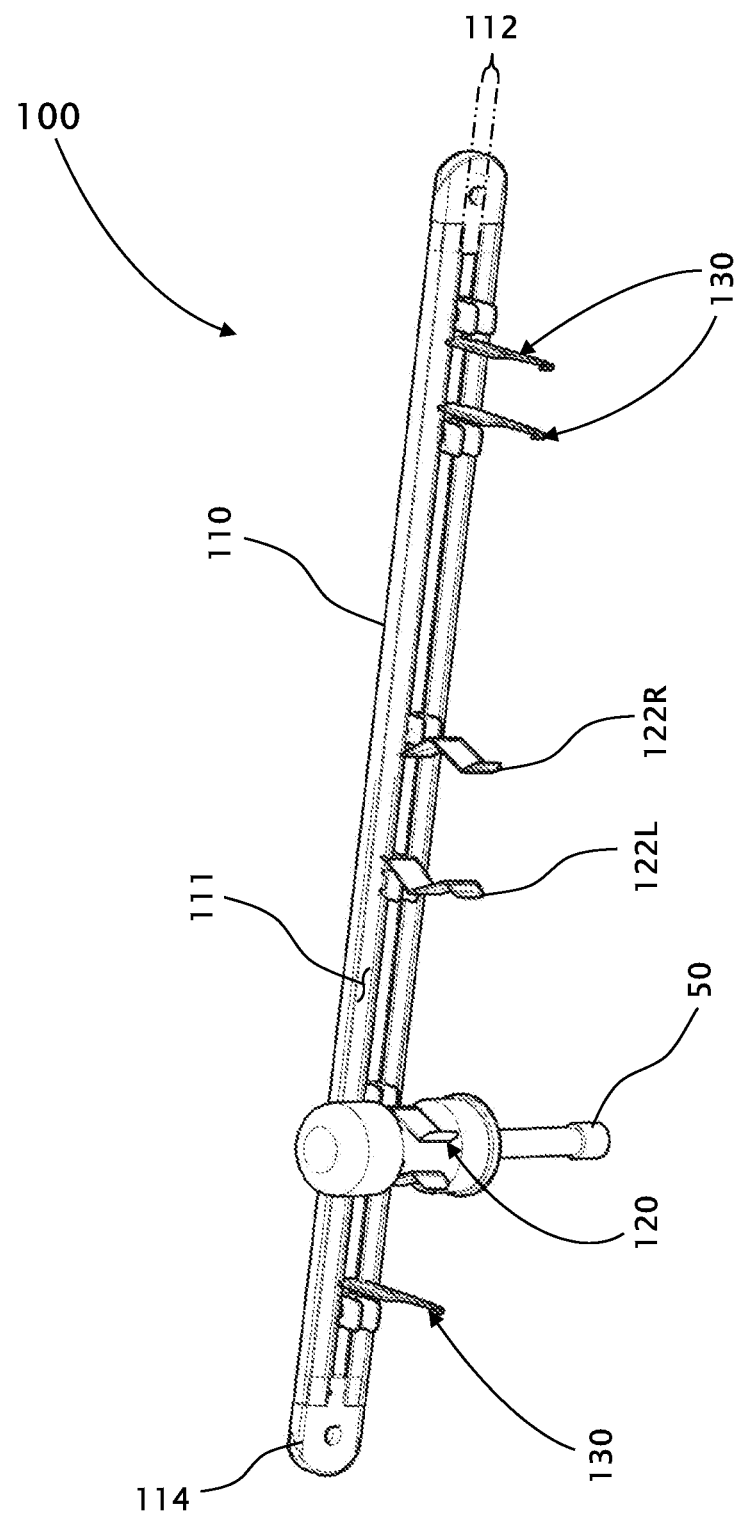
FIG. 1 is a perspective view of an embodiment of a holding-and-organizing apparatus for holding and organizing articles, constructed and operative according to embodiments of the present invention.

Reference is made to the drawings. FIG. 1 illustrates a perspective view of an embodiment of a holding-and-organizing apparatus 100 for holding and organizing articles, constructed and operative according to embodiments of the present invention.

By way of introduction, holding-and-organizing apparatus 100 of the present invention consists of a support element 110, hereafter referred to as the "rail" 110 for brevity, to which rail 110 are attached at least one holder element, hereafter referred to as a "clip" (such as embracing clip element 122 and hook clip element 130) for brevity. A principle of the present invention is to provide a rail that includes a slot with substantially parallel edges. It is another principle of the present invention to provide a clip that is deployable on the rail by inserting the position-retaining portion of the clip through the slot, at substantially any point along the length of the slot, the clip is further configured so as to engage the rail at substantially any point along the length of the slot. Once inserted, the clip is ready for use, wherein there is no need to rotate the clip into an operational position. While the embodiment of the rail herein described is made of one or more pieces, preferably extruded rail configured preferably from metal, however the use of plastic/polymers is within the scope of the present invention. Rail 110 may also be made from a sheet of metal.

It will be readily apparent to one of ordinary skill in the art that the forward and rearward walls of the rail need not be configured as parts of an integral unit, as herein described, but rather may be separate associated pieces that perform the same function. It will be further apparent that the forward and rearward walls may be configured as associated panels, the forward panel 111 may include a plurality of slots, and that the slots may be disposed at any given angle. The forward wall 111 may also be formed from separated pieces that are interconnected by a fitted spacer (116, see FIG. 6). The forward wall 111 may also be formed from separated pieces that are spaced apart so as to form a slot between them. Alternatively, the slot may be provided in a single walled rail.

Holding-and-organizing apparatus 100 includes a rail 110 having a hollow body and a substantially parallel-sided slot 112 formed therein the forward wall 111 of the rail 110. In some embodiments, forward wall 111 is configured with a plurality of slots 112. Holding-and-organizing apparatus 100 includes one or more clip elements such as a pair 120 of embracing clip elements 122 and hook clip elements 130, being spring elements, each constructed and operative according to embodiments of the present invention, and configured to be deployed inside the hollow body of rail 110.

Figure 2A:
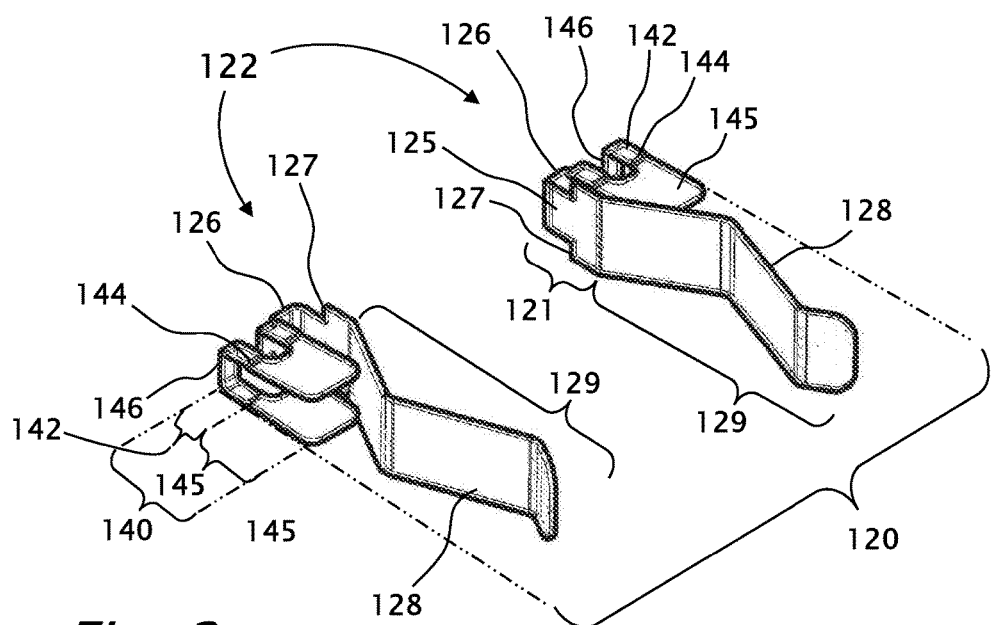
FIG. 2a is a perspective view of a pair of embracing clip elements constructed and operative according to embodiments of the present invention, this embodiment being configured to springly hold an article between two opposing such clips, the clips are shown here with the spring element of the position-retaining portion in a non-compressed state.
Figure 2B:
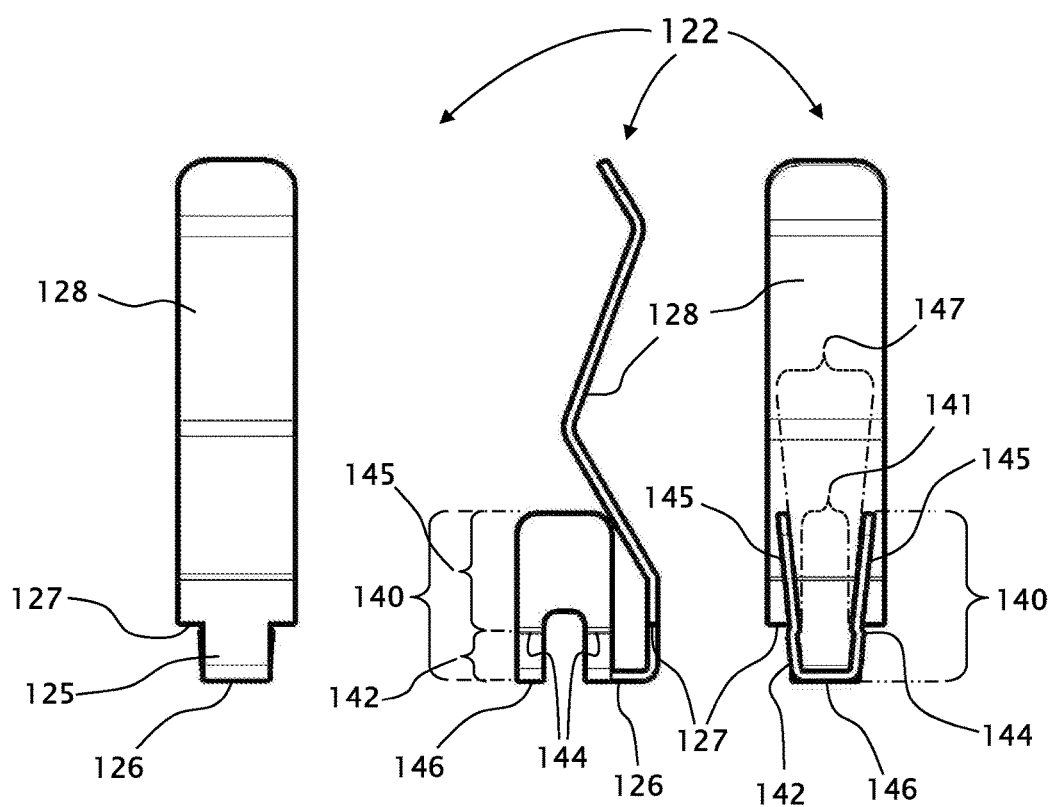
FIG. 2b illustrates the embracing clip elements in a front view, a rear view and a side view.
Figure 2C:
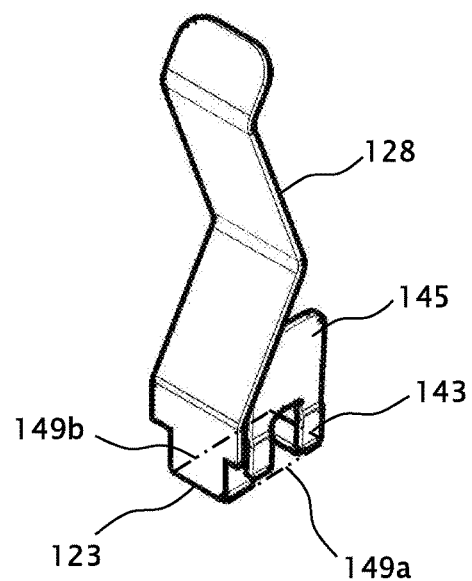
FIG. 2c illustrates the embracing clip elements in a perspective view.

FIG. 2a is a perspective view of a pair 120 of embracing clip elements 122. Embracing clip elements 122 are configured to springly hold an article, such as tool device 50, between two opposing such clip elements 122. FIG. 2b illustrates the embracing clip elements 122 in a front view, a rear view and a side view. FIG. 2c illustrates the embracing clip elements 122 in a perspective view.

Figure 3:
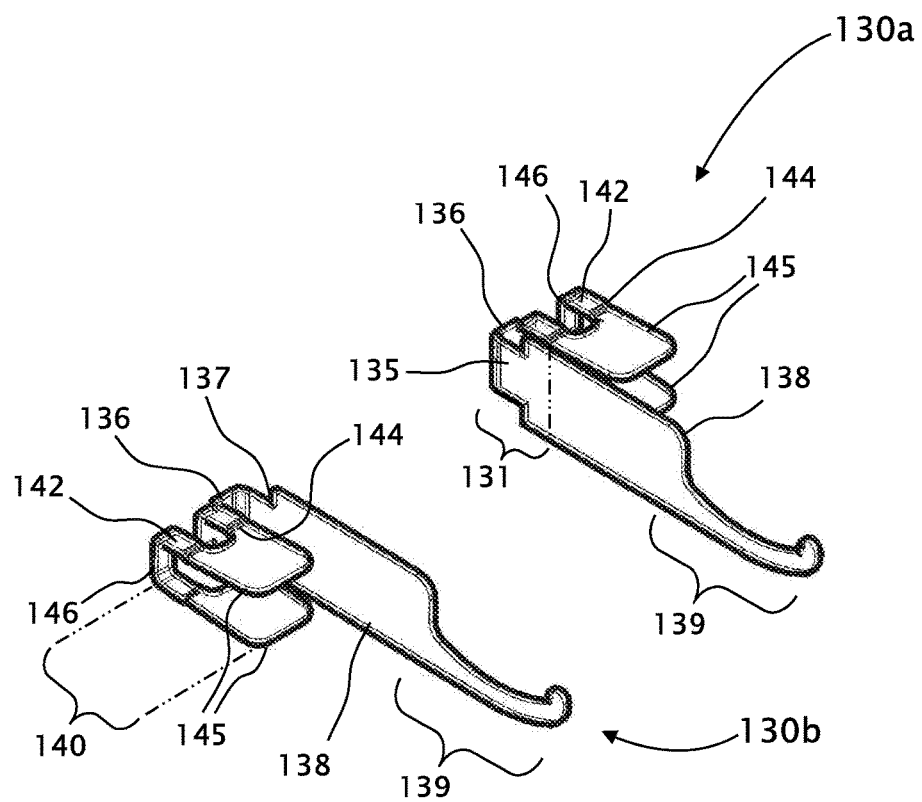
FIG. 3 is a perspective view of two other identical clip elements constructed and operative according to embodiments of the present invention, this embodiment configured with an individual hook.

FIG. 3 is a perspective view of another clip element constructed and operative according to embodiments of the present invention, this embodiment configured with a hook portion 139. It should be noted that hook clip element 130 may be formed to be inserted into rail 110 as a right side insertion hook clip element 130a or a left side insertion hook clip element 130b.

The clip elements (122, 130) include a position-retaining mechanism 140 having a pair of unlocking leaves 145, a base (146, 126, 136), a rail-engagement region (121, 131). It should be noted that while each leaf of the pair of unlocking leaves 145 described herein is shown as a single integral unit, this is not intended as a limitation, but rather as a non-limiting example. Embracing clip elements 122 and hook clip elements 130 are shown in FIGS. 2a, 2b, 2c and 3 with the unlocking leaves 145, being spring elements, in a non-compressed state.

Position-retaining mechanism 140 includes a pair of lower walls 142 that extend from each of the sides 149 of the base (146, 126, 136), starting at and proximal to a first end 143 of the base (146, 126, 136), the lower walls 142 being generally perpendicular to the base (146, 126, 136) and generally parallel to each other, but preferably, and with no limitations, slightly diverging from each other as the pair of lower walls 142 extend away from the base (146, 126, 136). Each unlocking leaf 145 extends from a respective lower wall 142, wherein the two unlocking leaves 145 are generally parallel to each other, but preferably, and with no limitations, slightly diverging from each other as the pair of unlocking leaves 145 extend away from lower walls 142. The space formed between the pair of unlocking leaves 145 is referred to as the inner space of position-retaining mechanism 140.

A lower gap 141 is formed between said of springy lower walls 142 and an upper gap 147 is formed between of unlocking leaf 145. The upper gap 147 and lower gap 141 facilitate motion of unlocking leaves 145 towards each other and thereby the motion of springy lower walls 142 towards each other.

While each unlocking leaf 145 extends from the respective lower wall 142, the unlocking leaf 145 is not flush with the respective lower wall 142, wherein a small ridge 144 may be formed on the external surface of each lower wall 142 at the border line between the unlocking leaf 145 and the respective lower wall 142, by bending the unlocking leaf 145 inwardly with respected to the respective lower wall 142 and the bending of the unlocking leaf 145 right back, to extend generally in the direction of the respective lower wall 142. Alternatively, a ridge 144 may be formed on the external side of each lower wall 142 at the border line between the unlocking leaf 145 and the respective lower wall 142, by a formed protrusion. In any embodiment, the distance of the ridge 144 from the respective side 149, on both sides is substantially identical. Furthermore, in any embodiment, the width measured between two respective ridges 144 must be larger than the width between the external lines immediately adjacent to the respective ridges 144.

While the pair of lower walls 142 and unlocking leaves 145 extend from the first end 143 of the base (146, 126, 136), an article support arm (128, 138), being an elongated portion with respect to the pair of unlocking leaves 145, also extends at the second end 123 (see FIG. 2c) of the base portions (126, 136), in the same direction. However, the flat surfaces of the article support arm (128, 138) are generally perpendicular to the flat surfaces of unlocking leaves 145. Article support arm 128 of each clip element (122, 130) includes a rail-engagement region (121, 131) and an article holding portion (129, 139). Article holding portion 129 of embracing clip element 122 is an article embracing portion 129 and article holding portion 139 of hook clip element 130 is a hook portion 139.

The rail-engagement region (121, 131) includes an arm-lower-wall (125, 135) that may be configured from flat materials, from which the flat article support arm (128, 138) extends away from the base portion (126, 136). Arm-lower-wall (125, 135) extends from the second end 123 of the base portion (126, 136), the arm-lower-wall (125, 135) being generally perpendicular to the portion (126, 136). Flat arm-lower-wall (125, 135) is narrower than flat article holding portion (129, 139), forming a stopper (127, 137) on both sides of flat article holding portion (129, 139) at the virtual boundary line between flat arm-lower-wall (125, 135) and article holding portion (129, 139).

Figure 4:
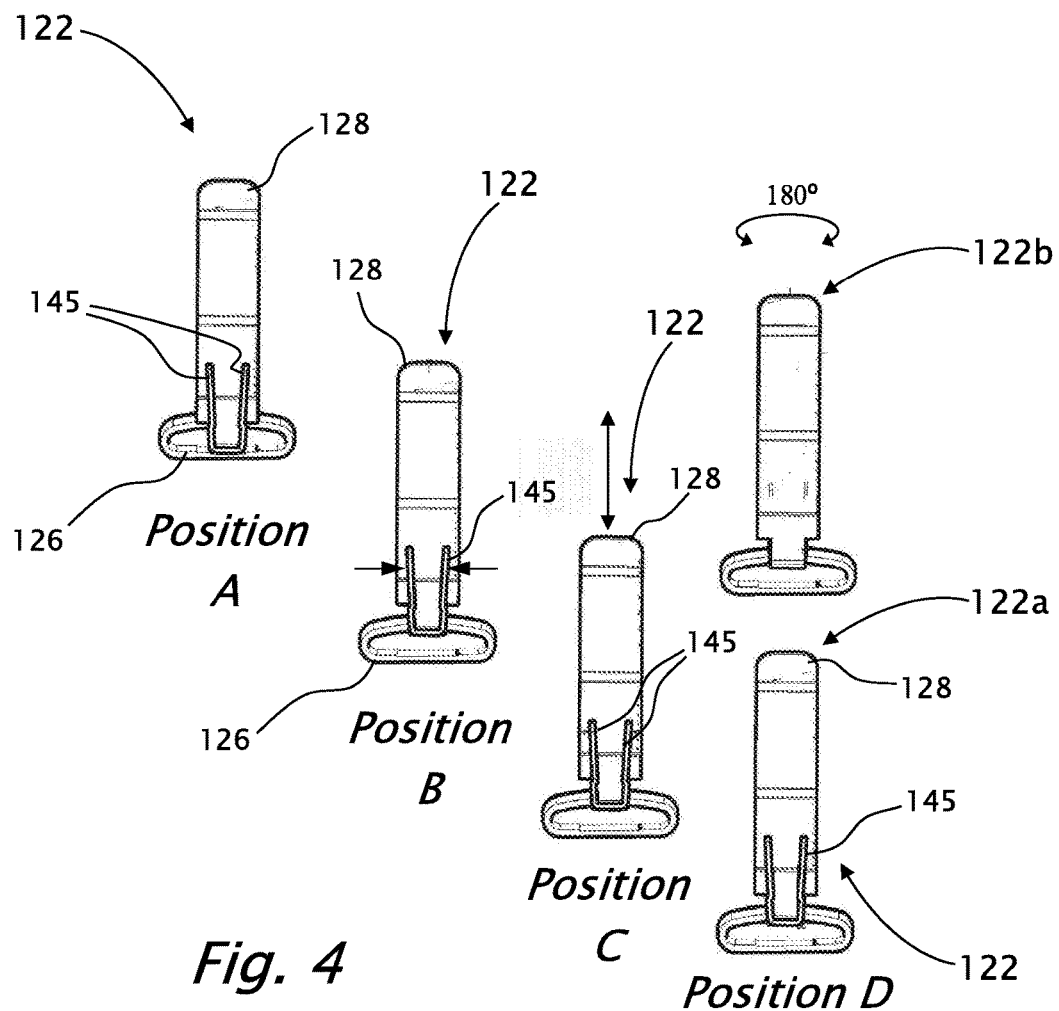
FIG. 4 shows five embracing clip elements at various deployed positions.

Stopper (127, 137) is spatially situated just above ridge 144, with respect to the base (146, 126, 136). The difference in height is configured to accommodate the width of forward wall 111 of the rail 110. The width of flat arm-lower-wall (125, 135) is configured to allow comfort insertion of clip element (122, 130) through slot 112 and into rail 110. Upon insertion of clip element (122, 130) into rail 110, ridge 144 goes through slot 112, pushing the arm-lower-walls (125, 135) towards each other, the arm-lower-walls (125, 135) being springy. Upon passing over the inner edges formed by the rims of slot 112 and the inner surface of forward wall 111, the springy arm-lower-wall (125, 135) move away from each other to thereby position ridges 144 adjacently to the internal surface of forward wall 111, and thereby lock clip element (122, 130) inside rail 110 and bring clip element (122, 130) to a deployed state. In the deployed state, stopper (127, 137) is configured to be situated proximately adjacent to the external surface of front wall 111. In FIG. 4, Position A illustrates an embracing clip element 122 in a deployed state.

To removes clip element (122, 130) from rail 110, unlocking leaves 145 are manually pushed towards each other, to thereby move ridges 144 away from being adjacent to the internal surface of forward wall 111 (see FIG. 4, Position B). Then, while unlocking leaves 145 are being pushed towards each other, the clip element (122, 130) is manually pulled out of rail 110, though slot 112 (see FIG. 4, Position C).

Figure 5:
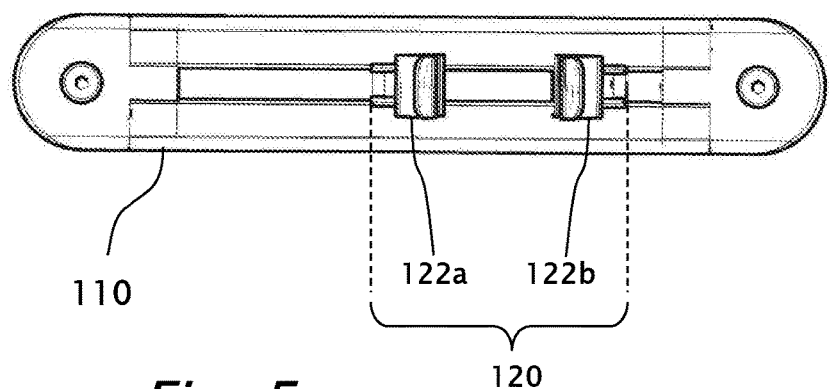
FIG. 5 is a front view of a holding-and-organizing apparatus, similar to that shown in FIG. 1.

In FIG. 4, Position D illustrates that an embracing clip element 122 can be deployed on rail 110 in either direction. This allows for a pair of embracing clip elements 122a and 122b to be deployed such that their respective article embracing portion 129 face each other (see clip elements 122a and 122b in FIG. 5), facilitating cooperative operation of holding a single article, such as article 50, as shown in FIG. 1.

Figure 6:
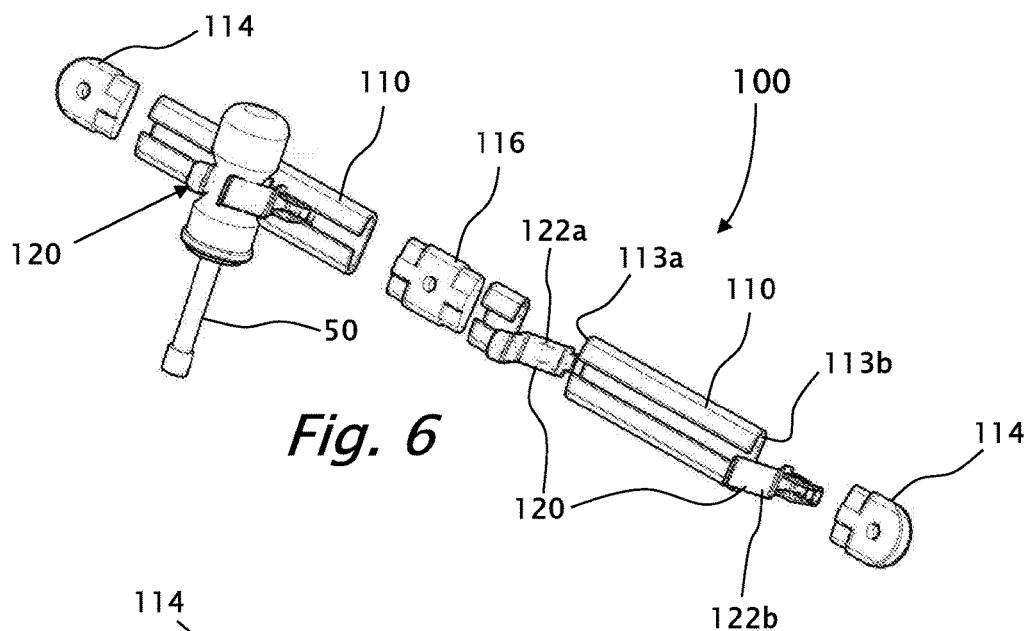
FIG. 6 is a perspective view of an embodiment of a modular-holding-and-organizing apparatus for holding and organizing articles, constructed and operative according to embodiments of the present invention.

Reference is also made to FIG. 6, showing a perspective view of a portion of holding-and-organizing apparatus 100, illustrating one alternative for deploying a clip element (122, 130) into the hollow body of rail 110 through the open ends 113 of holding-and-organizing apparatus 100. In the example shown in FIG. 6. Preferably, open ends 113 may be enclosed by fitted rail-plugs 114. A fitted mediating-plug 116 may be used to interconnect two segments rails 110.

Figure 7:
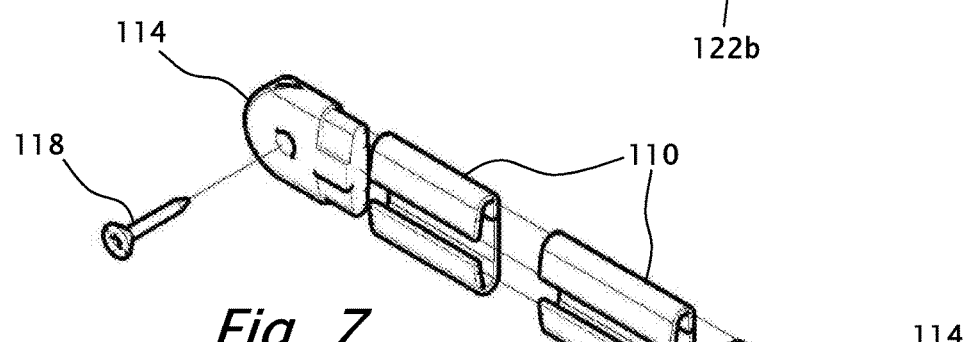
FIG. 7 is a perspective view of a portion of the rail of one variation of a modular-holding-and-organizing apparatus, with respect to the modular-holding-and-organizing apparatus shown in FIG. 6.
Figure 8:
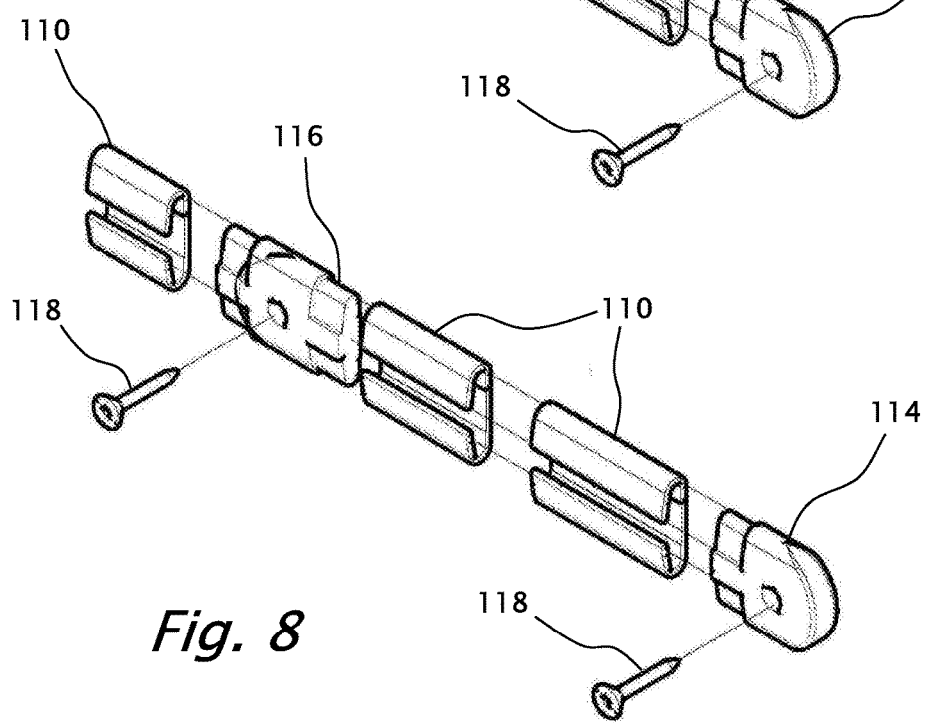
FIG. 8 is a perspective view of a portion of the rail of another variation of a modular-holding-and-organizing apparatus, with respect to the modular-holding-and-organizing apparatus shown in FIG. 6.

FIGS. 7 and 8 are perspective views of portions of rails 110 of variations of a modular-holding-and-organizing apparatus 100. Rail-plugs 114 and/or mediating-plugs 116 may also be used attach modular-holding-and-organizing apparatus 100 to a wall, for example, by screws 118.

As illustrated in FIG. 4, the steps of deployment of a clip element (122, 130) on the rail 110 is effected as follows:
Step 1: The rail-engagement region (121, 131) of the clip element (122, 130) is inserted through slot 112 in the forward wall 111 of the rail 110.
Step 2: The clip element (122, 130) is pushed manually inwardly into rail 110, thereby, the arm-lower-walls (125, 135) are pushed towards each other, the arm-lower-walls (125, 135) being springy.
Step 3: Once ridges 144 pass over the inner edges formed by the rims of slot 112 and the forward wall 111, the springy arm-lower-wall (125, 135) move away from each other in the open space of the hollow rail 110, to thereby place ridges 144 adjacently to the internal surface of forward wall 111, thereby lock clip element (122, 130) inside rail 110 and bring clip element (122, 130) to a deployed state.

To effect a change of a clip element's (122, 130) position, the unlocking leaves 145 are manually pushed towards each other and the clip element (122, 130) may be slid along the rail 110 in either direction to the desired location.

To remove a clip element's (122, 130) from the rail 110, the steps of deployment are simply reversed. That is, the unlocking leaves 145 are manually pushed towards each other and the clip element (122, 130) is removed through the slot 112.

Some of the advantages of the present invention with regard to the addition of new clip element (122, 130) to the rail 110, especially at points along a relatively full rail to which a new storage location is desired near the middle, will be readily apparent to anyone who has faced this situation.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A holding-and-organizing apparatus for holding and storing articles, the apparatus comprising:
   a) at least one support element having a forward wall configured with at least one slot, said slot being defined by spaced apart substantially parallel edges, said forward wall having a wall thickness, wherein an inner space is formed behind said forward wall; and
   b) at least one holder element comprising:
      i. a base having two sides, a first end and a second end;

ii. a position-retaining mechanism; and iii. an article support arm having an article holding portion, wherein said position-retaining mechanism includes a pair of springy lower walls that extend from each of said sides of said base, away from said base and both in the same direction, starting at and proximal to said first end of said base, and wherein a lower gap is formed between said springy lower walls;

wherein said position-retaining mechanism further includes a pair of unlocking leaves, wherein each said unlocking leaf extends from a respective said springy lower wall;

wherein a ridge is formed on an external surface of each said springy lower wall, at a border line between said springy lower wall and said respective unlocking leaf, and wherein a width measured between two respective ridges is larger than a width between a plurality of external virtual lines formed on the external surface of each said springy lower wall immediately adjacent to said respective ridges, and wherein an upper gap is formed between said unlocking leaves, and wherein said upper gap and said lower gap facilitate motion of said unlocking leaves towards each other and thereby motion of said springy lower walls towards each other;

wherein all said ridges have substantially equal distance from respective said base sides; and wherein said inner space is configured to receive a portion of said position-retaining mechanism; and wherein said springy lower walls are configured so as to be elastically deformable between a relaxed state and a compressed state, such that in said compressed state said position-retaining portion is insertable through said slot into said inner space, and wherein upon insertion of said springy lower walls through said slot, as the ridges pass the edges of the slot, said springy lower walls are released toward said relaxed state and said ridges engage with a plurality of inner rims of said slot and an inner surface of said front wall proximal to said inner rims of said slot, and wherein the external surface of said unlocking leaves, proximal to said ridge, engage said edges of said slot, thereby retaining said holder element in position on said support element at substantially any point along said slot.

2. A The holding-and-organizing apparatus as in claim 1, wherein said springy lower walls diverge slightly from each other as said pair of springy lower walls extend away from said base.

3. The holding-and-organizing apparatus as in claim 1, wherein said unlocking leaves diverge slightly from each other as said pair of unlocking leaves extend away from said base.

4. The holding-and-organizing apparatus as in claim 1, wherein said unlocking leaves are made of laterally flat springy material, and wherein a flat dimension of said unlocking leaves is parallel to said sides of said base.

5. The holding-and-organizing apparatus as in claim 1, wherein said article holding portion is configured so as to be elastically deformable.

6. The holding-and-organizing apparatus as in claim 1, wherein said article support arm includes an arm-lower-wall and said article holding portion, and wherein at least said article holding portion is made of laterally flat material.

7. The holding-and-organizing apparatus as in claim 6, wherein said arm-lower-wall extends from said second end of said base, in the same direction as said unlocking leaves.

8. The holding-and-organizing apparatus as in claim 7, wherein said article holding portion extends from said arm-lower-wall.

9. The holding-and-organizing apparatus as in claim 8, wherein said article support arm is substantially longer than said unlocking leaves.

10. The holding-and-organizing apparatus as in claim 8, wherein said arm-lower-wall is narrower than said flat article holding portion, forming a stopper on both sides of said flat article holding portion at a virtual boundary line between said arm-lower-wall and said article holding portion.

11. The holding-and-organizing apparatus as in claim 10, wherein said stopper is spatially situated more distal from said base than said ridge, by a distance that is substantially equal to a wall thickness of said arm-lower-wall.

12. The holding-and-organizing apparatus as in claim 11, wherein said stopper is spatially situated such that upon said insertion of said position-retaining portion through said slot and said springy lower walls are released toward said relaxed state so as to said ridges engage with the inner rims of said slot and the inner surface of said front wall proximal to said inner rims of said slot, and wherein the external surface of said unlocking leaves, proximal to said ridge, said stopper blocks the further insertion of said position-retaining portion through said slot.

13. The holding-and-organizing apparatus as in claim 1, wherein said at least one support element is configured as a rail with a constant cross-sectional profile.

14. The holding-and-organizing apparatus as in claim 13, wherein said at least one support element is an extruded rail configured from metals and plastics.

15. The holding-and-organizing apparatus as in claim 13, wherein open ends of said at least one support element are enclosed by fitted rail-plugs.

16. The holding-and-organizing apparatus as in claim 13, wherein at least two of said support elements are interconnected by a fitted mediating-plug.

17. The holding-and-organizing apparatus as in claim 1, wherein said article holding portion is configured to independently support an article.

18. The holding-and-organizing apparatus as in claim 1, wherein said article holding portion is configured as a hook.

19. The holding-and-organizing apparatus as in claim 1, wherein said at least one holder element is configured as at least two of said associated holder elements arranged to support an article.

20. The holding-and-organizing apparatus as in claim 19, wherein said holder elements are configured such that at least one said article holding portion comprises a springiness such that, once deployed on said support element, said springiness is in a direction substantially parallel to said slot, whereby an article is supported between said two holder elements by the force of a spring tension of said at least one springy article holding portion.

* * * * *